(12) United States Patent
Boomer et al.

(10) Patent No.: US 8,170,070 B2
(45) Date of Patent: May 1, 2012

(54) METHOD AND CIRCUIT FOR INTERLEAVING, SERIALIZING AND DESERIALIZING CAMERA AND KEYPAD DATA

(75) Inventors: James Boomer, Monument, CO (US); Oscar Freitas, Cape Elizabeth, ME (US)

(73) Assignee: Fairchildd Semiconductor Corporation, South Portland, ME (US)

( * ) Notice: Subject to any disclaimer, the term of this patent is extended or adjusted under 35 U.S.C. 154(b) by 347 days.

(21) Appl. No.: 12/112,136

(22) Filed: Apr. 30, 2008

(65) Prior Publication Data

US 2009/0116515 A1   May 7, 2009

Related U.S. Application Data

(60) Provisional application No. 60/915,814, filed on May 3, 2007.

(51) Int. Cl.
*H04J 3/02* (2006.01)
(52) U.S. Cl. ........................................... 370/538
(58) Field of Classification Search .......... 370/493–495, 370/535–545
See application file for complete search history.

(56) References Cited

U.S. PATENT DOCUMENTS

| | | | |
|---|---|---|---|
| 5,323,272 A * | 6/1994 | Klingler | 360/8 |
| 6,999,407 B2 * | 2/2006 | Moon | 370/215 |
| 7,143,328 B1 | 11/2006 | Altmann | |
| 2003/0048852 A1 | 3/2003 | Hwang et al. | |
| 2004/0160992 A1 | 8/2004 | Hunter | |
| 2007/0009060 A1 * | 1/2007 | Lavelle et al. | 375/295 |

FOREIGN PATENT DOCUMENTS

WO   WO 2006-095313 A   9/2006

OTHER PUBLICATIONS

"Notification of Transmittal of The International Search Report and the Written Opinion of the International Searching Authority, or the Declaration", published by International Searching Authority, European Patent Office, International Application No. PCT/US2008/005657, mailed Jul. 16, 2008, 14 pages.

"Video Demystified, Digital Video Interfaces", published in Video Demystified on Jan. 1, 2001, pp. 92-185.

* cited by examiner

*Primary Examiner* — Pao Sinkantarakorn
(74) *Attorney, Agent, or Firm* — Cesari and McKenna, LLP

(57) ABSTRACT

A system for interleaving high speed data and slower data that is serialized and delivered to a microprocessor. The typical source of the high speed data is a camera and the source of the slower data is a keyboard. The high speed data and the slower data, illustratively, are interfaced with a micro-processor in a parallel fashion. The present invention mirrors the parallel interface to the microprocessor, and mirrors the parallel interface to the sources of the high speed (camera) and slower (keypad) data. The present system formats parallel data from the sources and passes that data in serial form, typically with a clock, on a flexible cable that joins two sections of many cell phones or other hand held devices.

9 Claims, 2 Drawing Sheets

METHOD AND CIRCUIT FOR INTERLEAVING, SERIALIZING AND DESERIALIZING CAMERA AND KEYPAD DATA

RELATED APPLICATION

The present application is related to and claims the benefit of the provisional patent application Ser. No. 60/915,814, filed on May 3, 2007, and which provisional application is of the same inventorship, title and ownership as the present application. The provisional application is hereby incorporated herein by reference.

This application is also related to another provisional application, Ser. No. 80/915,803, entitled "Method and Circuit for Capturing Keypad Data Serializing/Deserializing and Regenerating the Keypad Interface," filed May 3, 2007, by the same inventors. This provisional application is incorporated herein by reference.

BACKGROUND OF THE INVENTION

1. Field of the Invention

The present invention relates to key pads and cameras, and more particularly to operations where key pad data and camera data occur together and share electronics in devices.

2. Background Information

Key pads and cameras are often found in mobile or cell phones. Typically input/output (I/O) operations of the two are sent over separate and unique interfaces. The data from the keypad and the camera may be sent in parallel or in serial fashion, but in prior art applications, the data from the keypad and the camera are not multiplexed or interleaved. In many cell phones these keypad and camera I/O signals are sent over a flexible hinge cable used in flip or slider cell phones but on separate wires.

Typical micro-processors in cell phone and other hand held devices include a parallel interface to a keypad that traversed the flexible hinge. Cameral signals also traverse the hinge on other wires. It would be more efficient if the wires in the hinge carried keypad interleaved with camera data.

In would be advantageous to reduce the number of wires or lines sent across flex cable, and the present invention provides for a reduced number of lines that need to traverse the hinge.

SUMMARY OF THE INVENTION

The present invention provides for interleaving over shared wires camera and keypad or other serial data that is slower than the HSYNC time cycle. The terms "camera" and "keypad" are herein defined as to include other devices that produce serial data as indicated herein. Although expressed as keyboard data below, virtually any serial data may be passed during the camera HSYNC time period. In a like manner, virtually any data that has a HSYNC time period in which its data signals are meaningless, may be used in conjunction with the slower serial data. That is LCD, video and the like may be multiplexed wherein during the HSYNC slower serial data may be sent. Since camera data is not passed during the horizontal synchronization signal (HSYNC) or the vertical synchronization signal (VSYNC), keypad data may be sent. In this embodiment, keypad data is sent during the HSYNC time period. Since keypad data operates at "human" speed and the camera HSYNC occurs often, the sending of keypad data only during HSYNC will be unnoticed by the user.

If HSYNC is not generated when the camera is not in use, that can be detected and keypad data serialized and sent over as using an oscillator to generate time signals.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
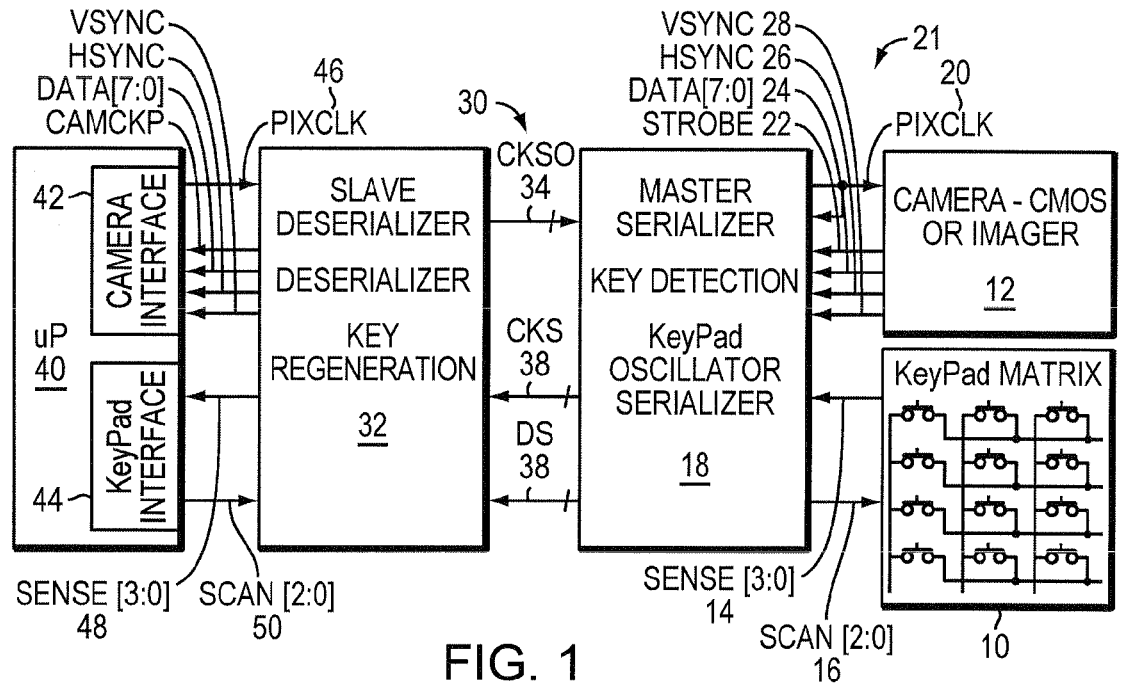
FIG. 1 is a schematic block diagram illustrating one embodiment of the present invention.

FIG. 1 is a circuit block diagram illustrating the electronic configuration of a key pad matrix 10 and a camera 12 as may be found in a cell phone.

The key pad matrix 10 is arranged into three columns and four rows. Four sense lines 14 and three scan lines 16 are enough to unambiguously determine which key might be depressed. These sense and scan lines are coupled to the Master Serializer 18.

The camera 12 interfaces with the Master Serializer 18 via connections 21 with a picture element clock, PIXCLK 20, a strobe 22, eight parallel data (a byte) lines 24, an HSYNC (horizontal synchronization) signal 26, and a VSYNC (vertical synchronization) signal 28. The organization/protocol using these signals are known and understood to those skilled in the art.

The Master Serializer 18 mimics or mirrors the interface that the micro-processor 40 would present to the cameral and keypad. In this fashion the Master Serializer is a virtual micro-processor to the camera and keypad. The Master Serializer receives parallel data from the camera 12 and from the keypad 10, in the same manner as would the micro-processor 40. That data is formatted into serial form and sent to the Slave Deserializer 32 over the flex 30 hinge with only a clock signal CKSO 34 (from Slave to Master), a clock, CKS, 36 from Master to Slave) and data lines DS 38.

The Slave Deserializer 32 mimics the camera and the keypad such that the micro-processor "believes" it is interfacing directly to the cameral and keypad. The Slave Deserializer is a virtual camera and keypad to the micro-processor.

The Slave Deserializer 32 interfaces with the micro-processor 40 via a camera interface 42 and a keypad interface 44. The camera interface connections 46 mirror the camera connections 21 between the camera 12 and the Master Serializer 18. The key pad interface to the base band microprocessor of four sense lines and three scan lines 50 mirror the connections 14 and 16 to the key pad itself.

Figure 2:
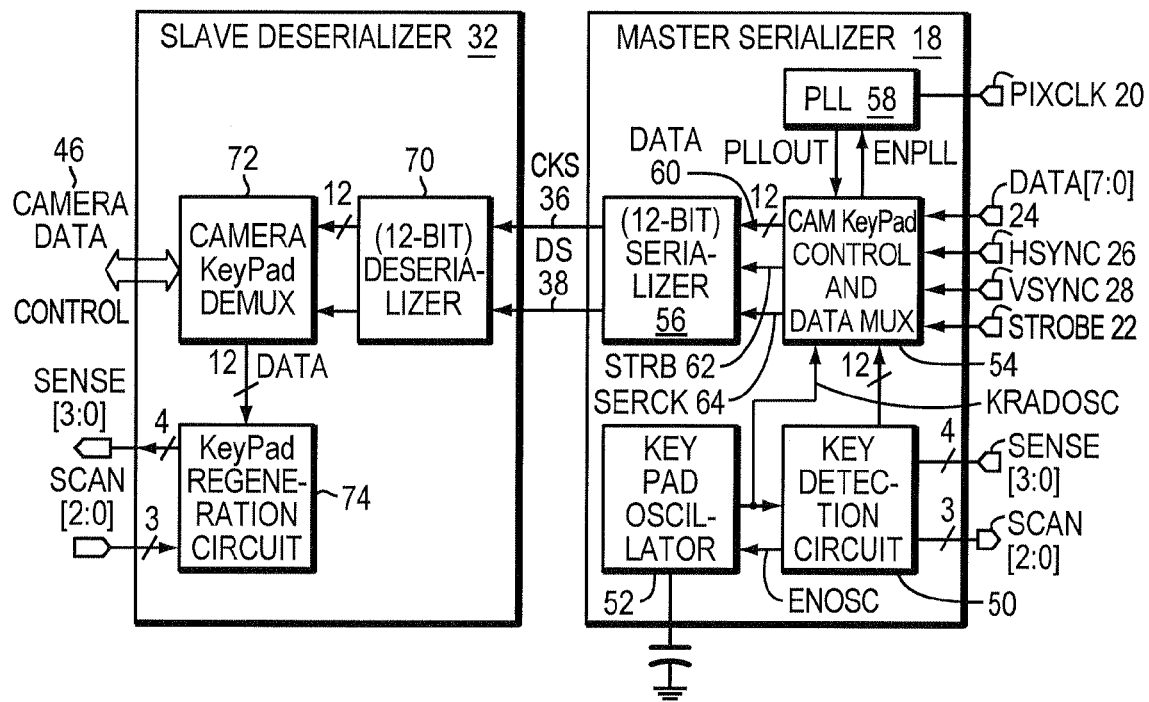
FIG. 2 is a schematic block diagram of the Master Serializer to Slave Deserializer part of the FIG. 1.

FIG. 2 illustrates in block form the electronic functions within the Master Serializer 18 and the Slave Deserializer 32.

There is a key pad detection circuit 50 that scans the key pad 10 (FIG. 1) and detects which key is depressed by sensing an oscillator 52 signal received. As known to those skilled in the art other techniques may be used to detect when a key is depressed. A control and data multiplexer 54 interleaves sending/receiving signals from the key pad and the camera, illustratively, in time. Care is taken so that the time restraints on the camera I/O are met while not missing any key pad depressions. The time sharing of transmissions via the multiplexer 54 are known to those skilled in the art.

When the key pad 10 is sending data via the control and data multiplexer 54 signals from the key detection circuit 50 and the oscillator 52 are sent to a twelve bit serializer 56. The key pad data is serialized and sent over the DS 38 along with a clock signal CKS 36 that provides timing for the Slave Deserializer to properly receive the key pad signals. The keypad data may be formatted or encoded in binary, hex, etc. as the designed might determine.

When the camera needs service a phase locked loop, PLL 58, that provides the picture element clock, PIXCLK 20 to the camera. The data lines 24, the HSYNC 26, the VSYNC 28, and the strobe 22 are sent directly to the controller and data multiplexer 54. The controller data multiplexer interfaces with the serializer 56 via, illustratively, twelve parallel data lines 60, a strobe, STRB 62 and a SERCK, a serial clock 64.

In one illustrative operation, when the camera is performing a HSYNC or VSYNC (horizontal or vertical synchronization), the camera data is invalid. During these times the key pad data may be transferred without corrupting either the key pad or the camera operations. The present invention uses the HSYNC, illustratively, time period to interleave or multiplex the keypad data and the camera data. The combined data is serialized and sent over the DS line with the CKS signal in the flex cable.

The Slave Deserializer 32 receives and deserializes the multiplexed key pad and camera data into parallel data and separates the two with demultiplexer 72. The key pad data is regenerated into parallel form 74 recognized by a microprocessor. The camera parallel data is also regenerated into a parallel form recognized by the microprocessor 40 as shown in FIG. 1.

In one embodiment, an additional wire may be included in the DS group that signals when keypad or camera data is being passed. Other methods may be used as known to those skilled in the art, for example the first byte passed on the DS lines might always be a mode indicator that indicates a given amount of camera (or keypad) data follows. Other techniques are known in the art.

Figure 3:
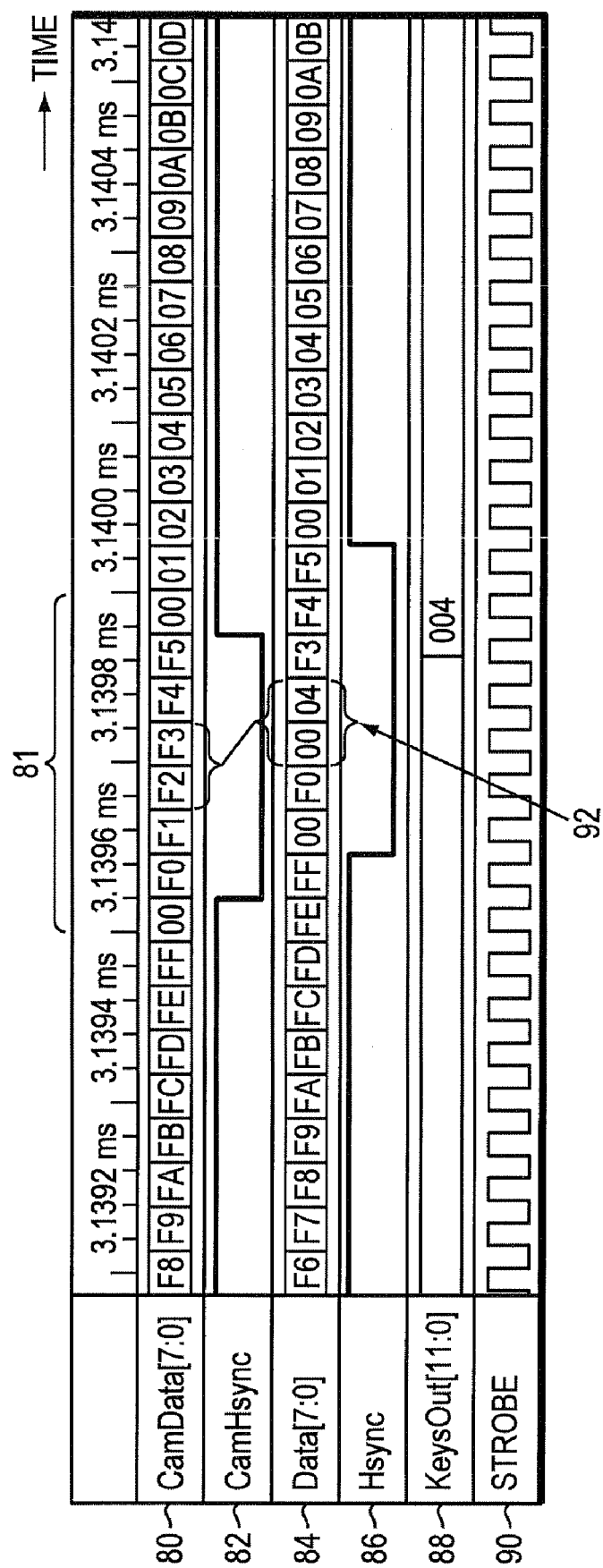
FIG. 3 illustrates traces of system waveforms where key pad data is being passed during the HSYNC, synchronizing signal, of the camera.

FIG. 3 illustrate a typical set of cameral and keypad waveforms that illustrate the present invention. Along the top is a TIME sequence that might be found for a typical camera— CMOS or CCD imager. The first row 80 of data signals each of one byte shown in hex format are illustrative data signals from the camera. The grouping of these signals 81 indicates a HSYNC true, horizontal synchronization, time period. The camera data signals, while HSYNC 82 is low, are indicated by bytes F0, F1, F2, F3, F4 and F5. The data on these lines is meaningless with respect to the camera. However, the HSYNC time is used in the present invention to send keypad data to the micro-processor via the Master Serializer/Deserializer. Note that Data 84 and HSYNC 86 are offset in time occurring later that the traces at 80 and 82. This time difference illustrates the delay times through the Master Serializer electronics. Also, note that during the HSYNC 86, the F2 and F3 data bytes from the camera have been replaced by the two byte groups, 00 and 04, indicated as item 92. The next row 88 shows the keypad data on twelve bits or hex 004. Only 1.5 bytes are used by the keypad so the leading four bits are made equal to zero so that bytes 00 04 are sent to the Deserializer. In this embodiment, the keypad data is sent replacing the F2 and F3 bytes of camera data during the HSYNC, but any of the data bytes during the HSYNC may be used as long as they are consistent. Keypad data may also be transferred during the VSYNC as would be known to those skilled in the art.

Illustratively, on the data byte following the 04 keypad data byte, the internal logic in the Master Serializer FIG. 3, as indicated above, illustrates the interleaving of the camera data 80 with the keypad data in the data sequence 84. Note that each hex formatted byte is timed in the data 84 sequence equally. That is the camera data and the slower keypad data are interleaved in the data sequence 84 with the same identical timing, as indicated by the single frequency strobe 90 that may be used as the CLKS 36 of FIG. 2.

In preferred embodiments, the system may be operated in several modes. In a first mode, low speed key pad, the PLL 58 is disabled, and the key oscillator 52 travels through the key pad matrix when a key is depressed levels on the serial lines. The key pad data is passed using LVCMOS (low Voltage CMOS).

A second mode, high speed camera/key pad, enables the PLL 58 (which becomes locked). The key pad data is captured and passed when the HSYNC signal 26 is low. Camera data is passed when HYSYNC 26 is high.

A third mode, high speed camera, passes no camera data. But key pad data is passed by the controller and a key pad data multiplexer provides a low, pseudo HYSYNC signal.

As would be known to those skilled in the art, other timing arrangements as well as other multiplexing arrangements may be used to advantage with the present invention. For example, the present disclosure uses an oscillator to detect and decode a key depression, but logic signals may be used, including voltage signals and/or current signals. In addition, there are many microprocessors that may be used to advantage. Additionally very large silicon integration circuits with dedicated functions may be used, as well as one chip computers.

A PLL is disclosed in this illustrative example, but, as known to those skilled in the art, operations without PLLs may be used. For example crystal clocks or the equivalent depending on the camera timing requirements, and other types of timing circuits may be used to advantage.

Although the implementation is shown herein as electronic circuits, those skilled in the art will understand that other electronic circuits may perform the same functions, and that systems employing software, firmware and/or hardware and combinations thereof may be used to advantage to accomplish equivalent functions.

What is claimed is:

1. In a system having a processor connected to a keyboard and to a camera through a flexible cable that is subject to stress during system operation, the camera providing a high speed data output and a horizontal synchronization signal, the improvement comprising:
  a first interface that receives parallel high speed data from said camera,
  a second interface that receives parallel slower speed data from said keyboard,
  a controller and data multiplexer that forms an interleaved sequence of the high speed camera data and slower speed keyboard data, the slower speed keyboard data being passed during the camera's horizontal synchronization signals;
  when the camera is passing no data, the controller and data multiplexer generates artificial or pseudo horizontal synchronization signals wherein keyboard data may be passed during the artificial or pseudo horizontal synchronization signals; and a serializer that receives the interleaved time sequence of parallel data from the multiplexer and outputs the interleaved sequence of parallel data in a serial data fashion at a single data rate over a single data line in said cable together with a single serial clock over another line.

2. The system of claim 1 further comprising:

a cable coupled to the serializer, wherein the cable carries the serialized data and a clock;

a deserializer coupled to the cable and arranged to receive the serialized data and the clock and output combined parallel data;

a demultiplexer that receives the combined parallel data and separates the parallel high speed camera data from the slower speed keyboard data;

a high speed data regeneration circuit that sends parallel high speed camera data to a microprocessor; and a slower data regeneration circuit that sends parallel slower speed keyboard data to the microprocessor.

3. The system of claim 2 wherein the high speed and slower speed data regeneration circuits mirror the operations and responses of circuits that generate the high speed and slower data.

4. The system of claim 1, wherein the first and the second interfaces mirror the operations and responses of a micro-processor.

5. The system of claim 1 wherein the source of the high speed data is a camera and the source of the slower speed data is a keypad or keyboard.

6. A process for transmitting data between a processor and a keyboard and a camera through a cable that is subject to stress during operation of the system, the camera providing a high speed data output and horizontal synchronization signals, the improvement comprising:

receiving parallel high speed data from said camera, receiving parallel slower speed data from said keyboard;

interleaving keyboard data with camera data, the keyboard data being passed during horizontal synchronization signals;

when the camera is passing no data, generating artificial or pseudo horizontal synchronization signals and passing keyboard data during the artificial or pseudo horizontal synchronization signals; and receiving the interleaved time sequence of parallel data from the multiplexer and outputting the interleaved sequence of parallel data in a serial data fashion at a single data rate over a single data line in said cable together with a single serial clock over another line.

7. The process of claim 6 further comprising the steps of:

carrying the interleaved serialized data and the single serial clock on separate lines in a cable;

receiving and deserializing the serialized data with the clock;

outputting parallel data from the deserializer;

separating the parallel data from the deserializer into parallel high speed data and the parallel slower speed data;

presenting the parallel high speed data to a microprocessor;

presenting the parallel slower speed data to a microprocessor.

8. The process of claim 7 wherein the step of presenting the parallel high speed and slower speed data to a microprocessor minors the operations and responses of circuits that generate the high speed and slower speed data.

9. The process of claim 6, wherein the step of receiving the parallel high speed and the slower speed data mirrors the operations and responses of a micro-processor.

* * * * *